United States Patent [19]
Nichols

[11] 3,961,866
[45] June 8, 1976

[54] GEOTHERMAL ENERGY SYSTEM HEAT EXCHANGER AND CONTROL APPARATUS

[75] Inventor: Kenneth E. Nichols, Arvada, Colo.

[73] Assignee: Sperry Rand Corporation, New York, N.Y.

[22] Filed: Aug. 14, 1974

[21] Appl. No.: 497,441

[52] U.S. Cl. .................... 417/379; 60/641; 165/45; 417/405; 417/408
[51] Int. Cl.² .............. F04B 17/00; F04B 35/00; F03G 7/02; F03G 7/04
[58] Field of Search .......... 417/405, 406, 379, 407, 417/408; 165/45; 60/641; 415/209, 207

[56] References Cited
UNITED STATES PATENTS

| | | | |
|---|---|---|---|
| 2,648,353 | 8/1953 | Haworth | 415/207 UX |
| 3,107,046 | 10/1963 | Frankel et al. | 415/207 X |
| 3,132,426 | 5/1964 | White | 415/503 X |
| 3,274,769 | 9/1966 | Reynolds | 165/45 X |
| 3,471,080 | 10/1969 | Gray | 415/209 UX |
| 3,751,673 | 8/1973 | Sprankle | 418/201 X |
| 3,817,038 | 6/1974 | Paull et al. | 60/641 |
| 3,824,793 | 7/1974 | Matthews | 60/641 |

FOREIGN PATENTS OR APPLICATIONS

| | | | |
|---|---|---|---|
| 867,716 | 5/1961 | United Kingdom | 415/214 |

*Primary Examiner*—William L. Freeh
*Assistant Examiner*—Richard E. Gluck
*Attorney, Agent, or Firm*—Howard P. Terry

[57] ABSTRACT

A geothermal energy transfer and utilization system extracts thermal energy stored in hot solute-bearing well water to generate super-heated steam from an injected flow of clean water; the super-heated steam is then used for driving a turbine-driven pump at the well bottom for pumping the hot solute-bearing water at high pressure and always in liquid state to the earth's surface, where it is used by transfer of its heat content to a closed-loop vapor generator-turbine-alternator combination for the generation of electrical or other power. Cooled, clean water is regenerated by the surface-located system for re-injection into the deep well and the residual concentrated solute-bearing water is pumped back into the earth. The invention features heat exchanger apparatus located adjacent the turbine-driven pump for permitting steam exhausted by the turbine to cool that part of the re-injected water used as a hydraulic bearing lubricant.

4 Claims, 5 Drawing Figures

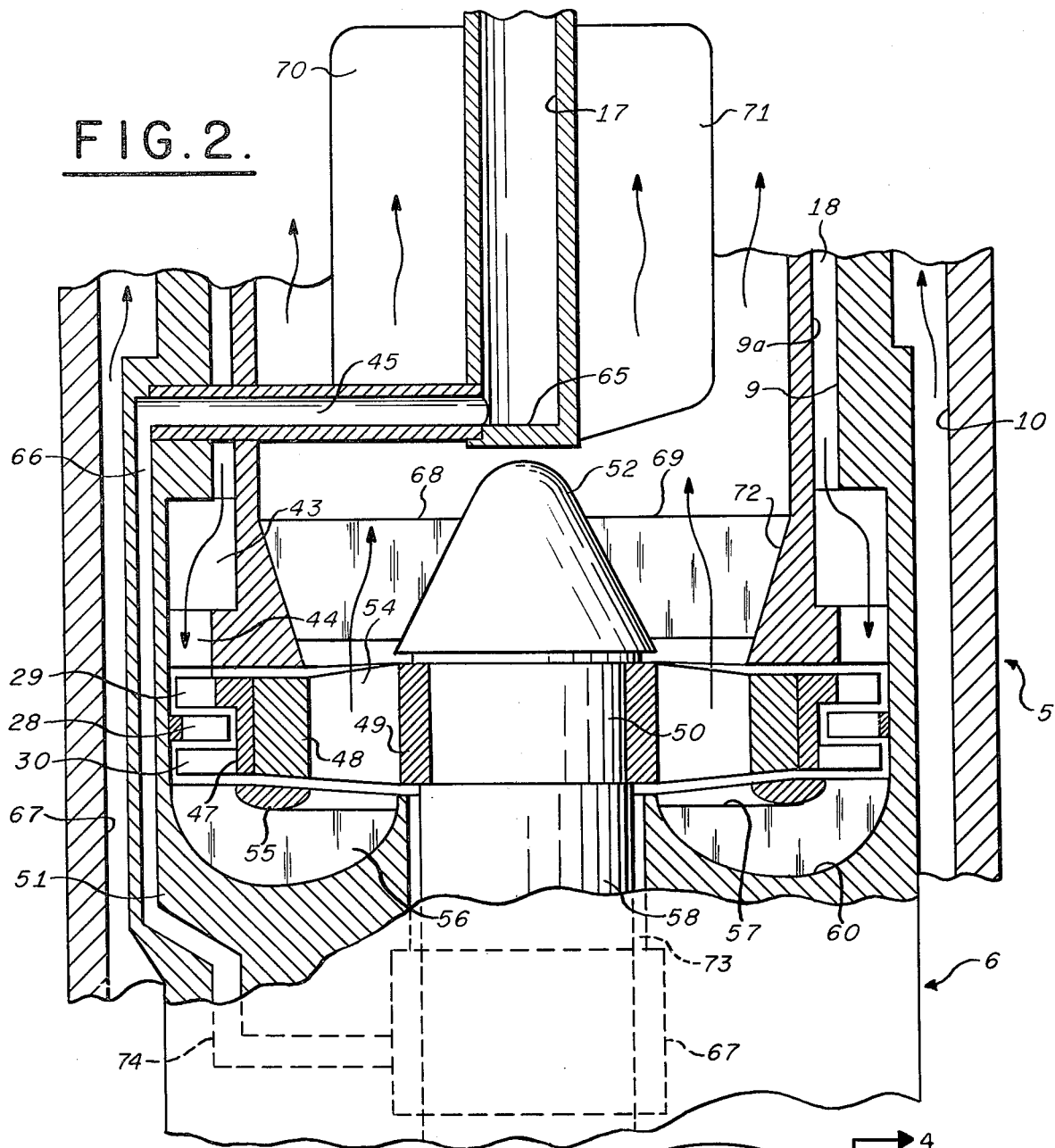
FIG. 2.
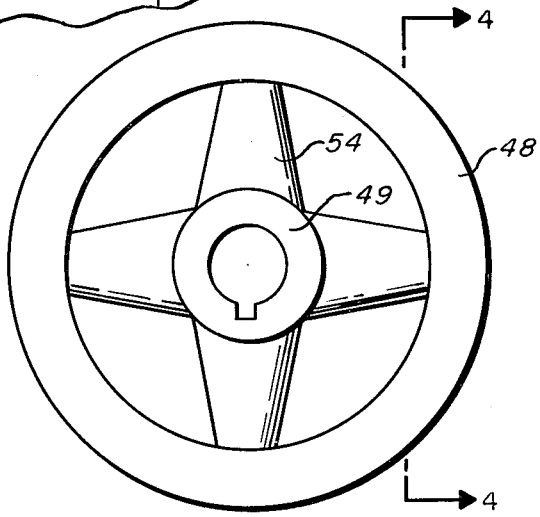
FIG. 3.
FIG. 4.

GEOTHERMAL ENERGY SYSTEM HEAT EXCHANGER AND CONTROL APPARATUS

BACKGROUND OF THE INVENTION

1. Field of the Invention

The invention relates generally to efficient means for the generation of electrical or other power utilizing energy from geothermal sources and, more particularly, relates to arrangements including efficient super-heated steam generation and pumping equipment for long-life application in deep hot water wells for the useful transfer of thermal energy to the earth's surface.

2. Description of the Prior Art

While geothermal energy sources have been employed for the generation of power, generally known prior art systems operate with relatively low efficiency and have additional serious disadvantages. In the few installations in which substantially dry steam is supplied by wells at the earth's surface, the steam may be fed after removal of solid matter from the well head directly to a turbine. On the other hand, most geothermal wells are characterized by yields at the earth's surface of a mixture of steam and hot water along with corrosive solutes, so that the water must be separated from the steam before the latter is used in a turbine.

In both kinds of installations, relatively low pressure steam normally results, requiring employment of special turbines and yielding relatively inefficient power generation as compared to the efficiency of generation of power using normally operated fossil fuel or nuclear-powered electrical generation equipment. In only a few instances do existing geothermal wells actually produce truly super-heated steam with only minor amounts of undesired gasses and with no liquid water.

The pressure of significant amounts of liquid water in wells used with prior art geothermal systems presents other problems in addition to the separation problem. If the water is only moderately hot, extracting thermal energy from it may be expensive or, at least, inefficient. Whether or not the heat is used, the water must be handled. The water usually bears considerable concentrations of silica and of corrosive alkali salts, including chloride, sulfate, carbonate, borate, and the like ions, all of which dissolved materials present precipitation problems at the point at which any part of the water may abruptly flash into steam. If the alkaline water is allowed to escape at the installation, severe chemical and thermal pollution of streams or rivers results. Finally, there is evidence that the removal of large amounts of water from geothermal reservoirs may lead, in a generally unpredictable manner, to undesirable land subsidence in the vicinity of thermal well installations.

A major advance in the art of extraction and use of geothermal energy is reflected in the H. E. Matthews U.S. patent application Ser. No. 300,058 for a "Geothermal Energy System and Method" filed Oct. 24, 1972, issued July 23, 1974 as Pat. No. 3,824,793, and assigned to the Sperry Rand Corporation. The prior Matthews invention provides means for efficient power generation employing energy derived from geothermal sources through the generation of dry super-heated steam and the consequent operation of sub-surface equipment for pumping extremely hot well at high pressure to the earth's surface. Clean water is injected at a surface station into the deep well where thermal energy stored in hot solute-bearing deep well water is used at a deep well station to generate super-heated steam from the clean water. The resultant dry super-heated steam is used at the well bottom for operating a turbine-driven pump for pumping the hot solute-bearing well water to the station at the earth's surface. The water is pumped at all times and locations in the system at pressures which prevent flash steam formation. The highly energetic water is used at the surface station in a binary fluid system so that its thermal energy is transferred to a closed-loop surface-located vapor generator-turbine system for driving an electrical power alternator. Cooled, clean water is regenerated by the surface system and is re-injected under pressure into the well for operation of the steam turbine therein. Undesired solutes are pumped back into the earth via a separate well in the form of a concentrated brine.

In contrast to the relatively poor performance of other prior art systems, the prior Matthews invention is characterized by high efficiency as well as by other advantageous features. It is not limited to use with the rare dry steam sources, and it is devoid of the water and steam separation problems attached to prior art systems used at mixed steam and hot water supply wells. Since the novel power system operates with dry, highly superheated steam, existing efficient heat transfer elements and efficient high pressure turbines may readily be employed. According to the invention, the very large calorific content of high temperature water subjected to high pressure is efficiently employed. Since high pressure liquid is used as the thermal transfer medium, undesired flash steam formation is prevented, along with its undesired attendant deposition of dissolved materials. Because the dissolved salts are efficiently pumped back deep into the earth as remotely as need be from the geothermal source, surface pollution effects are avoided and there is relatively little risk of land sinkage in the vicinity of the geothermal source.

SUMMARY OF THE INVENTION

The present invention is an improvement over that of the aforementioned Matthews patent and provides long life and efficient operation particularly of those parts of the system employing clean water re-injected into the well from the earth's surface, in particular for providing a lubricating fluid in fluid bearings supporting the rotors of the deep well turbine — pump system. As the clean lubricant flows toward the turbine — pump bearings, it is progressively heated, being unavoidably exposed to heat transferred from the rising pumped hot well water. The lubricant water is maintained, in part, in the fluid state because it is under high pressure so that it is not allowed to flash into steam. It is further desired that the water additionally benefits by cooling near its point of use so as fully to prevent its flashing or vaporization within the hydraulic bearings.

In some applications, the heat from the hot pumped well water may raise the lubricating water to a temperature near that of the well water. In these circumstances, very high pressures are required to prevent flashing of the lubricating well water within the bearings. In practice, sub-cooling merely by increasing the lubricating water pressure is not found to be practical as the well water approaches the critical temperature of the clean water of 704° Fahrenheit. Furthermore, the load capacity of the hydrodynamic bearings employed is proportional to the viscosity of the lubricant; thus, lower temperatures in the bearings provide increased load capacity, viscosity increasing with decreasing temperature.

The invention accomplishes the desired result by making effective use of the exhaust steam from the steam turbine that drives the hot well water pump. This exhaust steam is significantly cooler than the pumped hot well water, in part because of the expansion and energy exchange process which transpires within the driving turbine. The low temperature turbine exhaust steam is therefore passed in heat exchanging relation with respect to the lubricating water, additionally cooling the latter.

BRIEF DESCRIPTION OF THE DRAWINGS

FIG. 2 is an elevation view in partial cross section of the novel deep geothermal well heat exchanger apparatus.

FIG. 3 is a plan view of the rotor portion of the apparatus of FIG. 2.

FIG. 4 is a view in partial cross section taken along the line 4—4 of FIG. 3.

DESCRIPTION OF THE PREFERRED EMBODIMENTS

Figure 1:
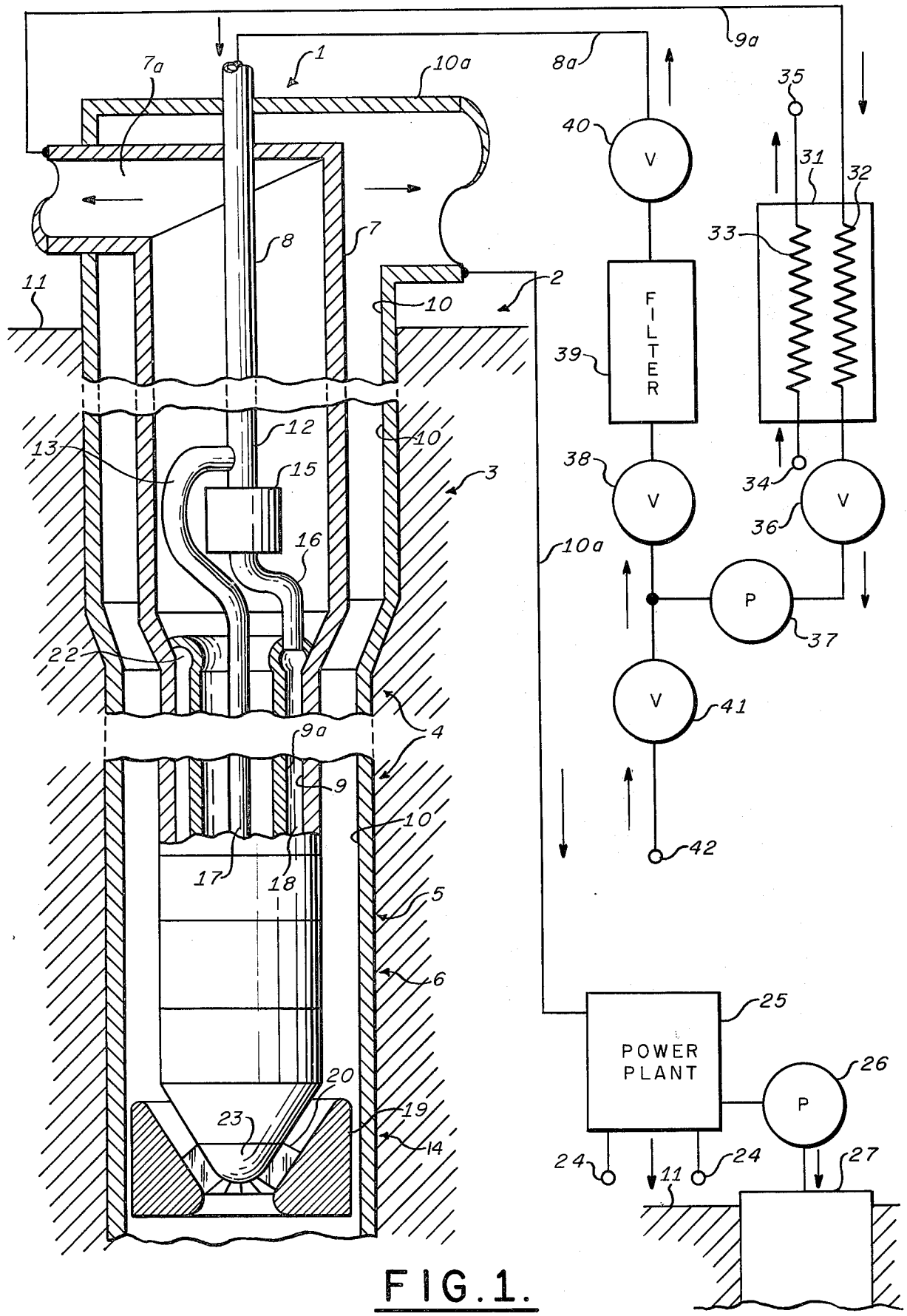
FIG. 1 is a diagrammatic representation of the invention, illustrating apparatus located at the earth's surface and its connections with the deep well pumping apparatus.

FIG. 1 illustrates the general structure and characteristics of the portion of the novel geothermal energy extraction system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located at the earth's surface 11 and a main well section 2 extending far downward from well head section 1 below the earth's surface 11. At the subterranean source of hot, high pressure water, the main well section 2 joins a steam generator input section 3. The steam generator section 4, the steam turbine section 5, a rotary bearing section 6, and a hot water pumping section 14 follow in close cooperative succession at increasing depths.

Extending downward from the well head section 1 at the earth's surface 11, the well casing pipe 10 surrounds in preferably concentric relation an innermost stainless steel or other high quality alloy steam pipe or conduit means 8 for supplying a flow of relatively cool and relatively pure water at the bottom of the well for purposes yet to be explained. A second relatively large pipe or conduit 7 of similar quality and surrounding pipe 8 is also provided within well casing 10, extending from well head 1 to the energy conversion and pumping system at the bottom of the well and permitting turbine exhaust steam to flow to the surface of the earth within it, as will be described.

It will be seen from FIG. 1 that relatively clean and cold water is pumped down the inner pipe 8 from the surface 11 to the region of the pipe tee 12. At tee 12, the downward flowing water is divided between two branch paths. A first branch path feeds clean lubricating water through pipes 13 and 17 for lubricating a system of bearings within the system bearing section 6. The second branch path feeds clean water through pressure regulator system 15 via distribution pipe or pipes 16 to the input manifold 22 of a steam generator 18 formed between the generally concentric alloy pipe walls 9 and 9a. Accordingly, high pressure steam is generated and delivered to a steam turbine located within turbine section 5.

The function of the steam turbine located at section 5 and supported on bearings located within bearing section 6 is to drive a hot water pump located at pump section 14. Hot, high pressure water is thus impelled upward by the rotating pump vanes 20 between the rotating conical end 23 of the pump and an associated rotating or stationary pump shroud 19; the hot water is pumped upward at high velocity in the annular conduit between pipes 7 and 10, thus permitting use of the thermal energy it contains at the earth's surface, as will be described. More important, the hot water is pumped upward to the earth's surface 11 at a pressure always sufficient for preventing it from flashing into steam and thus undesirably depositing dissolved salts at the point of incipient flashing.

Accordingly, it is seen that the extremely hot, high-pressure well water is pumped upward, flowing in the annular region defined between allow pipes 7 and 10. Heat supplied by the hot well water readily converts the clean water flowing into manifold 22 of the steam generator 18 into highly energetic, dry, super-heated steam. The clean water, before flowing through tee junction 12 and pressure regulator 15, is at a very high pressure in part due to its hydrostatic head and normally also because of the normal operation of the high pressure pump 37. The pressure regulator 15, as described in the aforementioned Matthews patent, controls the pressure of the clean water flowing therethrough so that it may readily be vaporized and super-heated in the volume 18 of the steam generator. The highly energetic steam drives the steam turbine and is redirected to flow upward to the earth's surface 11 after expansion to form relatively cool steam flowing within the annular conduit defined between alloy pipes 7 and 8. Thermal energy may be recovered, as will be discussed, at the earth's surface 11 primarily from the loop containing hot, high pressure water, but may also be retrieved from the turbine exhaust steam.

It will be appreciated from FIG. 1 that a severe problem to be solved in devising practical forms of the invention lies in creating a configuration which is compact, as well as efficient, especially in view of the consideration that the operating structure is preferably to be inserted into a well casing of standard size. Compactness of the structure, as well as efficiency of operation are therefore prime features of the apparatus of FIG. 2, which apparatus is found within the turbine structure section 5 of FIG. 1.

Referring particularly to FIG. 2, it is seen that the conduits of FIG. 1 extend into the steam turbine section 5. For example, the pumped hot water passage is located between pipes 9 and 10, while opposed surfaces of pipes 9 and 9a define the downward steam output passage 18 of the steam generator. Between pipes 9a and 17 is the passage for upward flowing exhaust steam from the turbine. The pipe 17 is effectively extended to permit downward flow of clean water into and past the steam turbine section 5 via the channels 45 and 66.

For operating the steam turbine of FIG. 2, the steam from the steam generator 18 between pipe surfaces 9 and 9a is injected into an annular manifold 43, from whence it flows into an array of steam injection nozzles at location 44 of generally conventional design. The nozzles 44 are employed in the conventional manner to direct the high velocity steam against the blades of the turbine stages.

Single or multiple stage turbine blade systems of various known types may be employed in the system. However, for purposes of illustration, a multiple stage arrangement is presented, first and second stages being provided by respective pluralities 29 and 30 of vanes which pend in circular arrays from a circular base ring 47. The rotor arrays of vanes 29 and 30 cooperate with an intermediately located conventional array 28 of stator vanes affixed to the body block 51 common to the turbine section 5 and bearing section 6. The ring 47 bearing the vane arrays 29 and 30 is affixed in a conventional manner to the wheel rim 48. Rim 48 is part of a wheel additionally provided with a set of spokes 54 and a hub 49. Hub 49, when the rotor system is rotating, causes shaft portions 50 and 58 also to rotate with it, the hub 49 being securely fastened on shaft portion 50 by conventional means on a threaded extension of shaft portion 50 located within the tapered shell 52.

A feature of the invention permitting compactness of design is concerned with the disposal of expanded steam which has yielded useful energy to the turbine rotor; the feature aids in solving the particular problem of redirecting the exhaust steam without the requirement of space consuming elements. For this purpose, the turbine body block 51 contains an annular smoothly curved toroidal passageway 56 which redirects steam issuing from the rotary vane array 30 radially inward towards shaft portion 58, at the same time altering its direction so that the steam is caused to flow upwardly. The annular passageway 56 is defined by a suitably curved surface 60 cast within the body block 51 and by the surface of the opposed annular ring or guide 55. Ring guide 55 may be supported by an array of radially extending vanes 57 which, in addition to supporting the ring guide annulus 55 with respect to turbine body block 51, also tend to redirect the exhaust steam so that its velocity is primarily vertical, rotational components of motion being reduced in amplitude. Accordingly, it is seen that there is formed a smooth-sided toroidal steam expanding passageway directing the steam after it exits the annular vane array 30 until it passes again through the turbine wheel.

The passage of steam through the latter is particularly facilitated by arranging the spokes 54 of the turbine wheel as illustrated particularly in FIGS. 3 and 4 so that the steam passes through the wheel, in essence, as if the spokes 54 were not present. The spokes 54 are individually tilted with respect to the direction of the rotation of rim 48 so that their effect at the selected operating rotational speed of the rotor is entirely neutral. In fact, spokes 54 are shaped and are provided with an angle of incidence with respect to the direction of steam flow so that they desirably neither add energy nor subtract energy from the upward flowing steam. Further, steam passages outside of the periphery of the rotating element of the steam turbine are not required and the resultant blocking of the flow of the pumped hot well water is avoided. As previously noted, it will be apparent to those skilled in the art that alternative features of known steam turbines may be employed within the scope of the invention. By way of further example, a double-stage re-entry turbine may be employed in which the steam is passed downward through one set of nozzles of a turbine having a single array of blades and is then reversed to flow upward through a second set of nozzles and the same turbine blades, the used steam again being exhausted in the general direction indicated in FIG. 2.

Cooling of the lubricating water flowing downward in conduit 17 is achieved by the cooperative action of apparatus now to be described. Its purpose is to afford a copious flow of clean bearing lubricating water, always in liquid state, through the pipe 17 capped at its end 65, through the generally horizontal conduit 45, and again generally downward through the conduits 66 and 74 and body block 51 into hydraulic bearing system 67, which may include both thrust and radial bearing elements. Constricted flow out of the bearing system 67 is by virtue of the annular clearance volume 73 around shaft portion 58 into the toroidal exhaust passage 56 of the steam turbine. Shaft portion 58 extends into the pump section 14 for driving the hot well water pump therein.

A tapered generally conical part 52, in the form of a diffuser cone which may be hollow, is held in position just above the hub 49 of the turbine rotor. For example, diffuser cone 52 may be positioned above hub 49 by an array of vanes 68, 69 only two of which are shown in the figure. The vanes 68, 69 additionally serve to reduce rotational motion of the steam, increasing its upward speed, and are affixed to wall 72 of body block 51. Surrounding cone 52 is the cooperating oppositely tapered wall 72 formed in body block 51 and cooperating with tapered cone 52 in directing the upward flow of the turbine exhaust steam.

Having performed useful work in passing through the turbine, the exhausted steam is relatively cool and may be additionally cooled in passing upward in the annular expanding volume between cone 52 and the concentric wall 72. The cooled exhaust steam thus finds itself in the vicinity of the lubricating fluid pipe 17, where it is readily used to abstract heat from the lubricant. For augmenting this effect, a plurality of vanes 70, 71, only two of which are shown may be affixed to the surface of pipe 17. The vanes 70, 71 extend only part way toward pipe 9a, since pipe 9a is heated by the hot pumped well water flowing upward in the well casing 10 and a direct thermal path therefrom would not be desirable.

Figure 5:
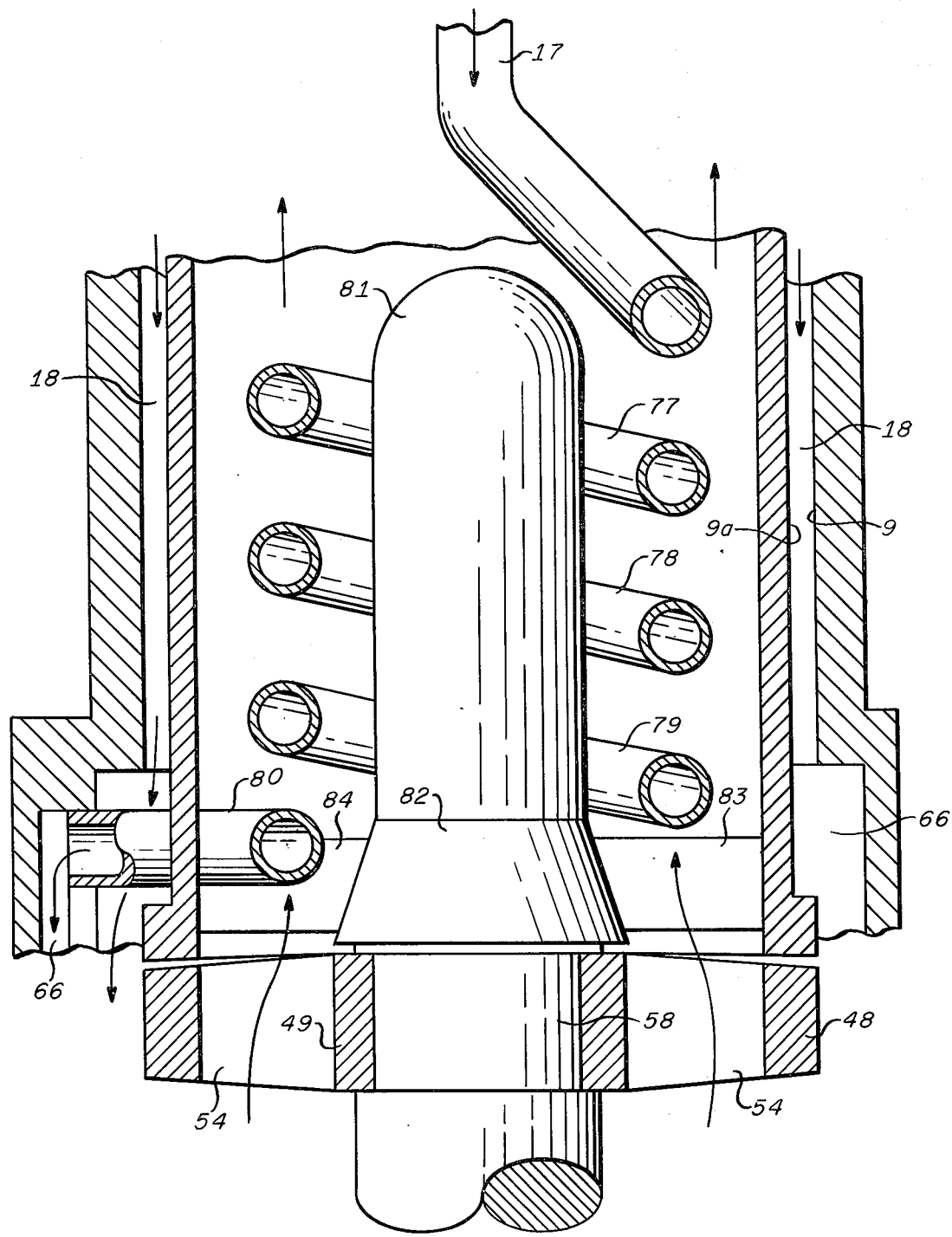
FIG. 5 is an elevation view in partial cross section of an embodiment alternative to that of FIG. 2.

In the alternative heat exchange system of FIG. 5, elements similar to those of FIG. 2 bear similar reference numerals, including conduit surfaces 9, 9a, lubricating water conduit 17, the annular steam generator volume 18, turbine rotor rim 48, turbine rotor hub 49, spokes 54, shaft portion 58, and clean water injection conduit 66. Rim 48 is shown without the rotor vanes 29, 30 and associated steam turbine equipment merely as a matter of simplifying the drawing, since the nature of such cooperating structures will be evident from FIG. 2.

In the system of FIG. 5, the generally conical element 52 of FIG. 2 is replaced by a generally cylindrical shell 81 having a truncated conical base 82 situated at its base similarly to cone 52. The central diffusion structure comprising portions 81, 82 may be supported by a plurality of vanes 83, 84, only two of which are shown in the drawing. The vanes 83, 84 not only support elements 81, 82, but also desirably diminish rotation of the turbine exhaust steam. The clean lubricating water flows downward in conduit 17 through a plurality of heat exchanger coils such as coils 77, 78, and 79, to be withdrawn through the generally horizontal exit pipe 80 for supply to conduit 66 and subsequently to bearing system 67. In this manner the expanding exhaust steam affords high velocity flow over coils 77, 78, 79, 80, efficiently cooling the flowing lubricating water as desired.

Referring to FIG. 1, and as also described in the aformentioned Matthews patent, the hot, high pressure water within the well casing pipe 10 is fed by pipe 10a to a conventional surface thermal plant 25 which may include in the usual manner a vapor generator system in which a major part of the energy in the hot geothermal fluid is converted into high pressure vapor for driving an alternator supplying electrical energy on power lines 24, 24. The cooled fluid is pumped by a surface located, high pressure pump 26 back into the earth via the auxiliary re-injection well 27. Thus, the geothermal fluid flow loop is effectively completed and fluid and dissolved mineral salts are returned into deep strata of the earth.

Still referring to FIG. 1, the closed loop for supplying and re-injecting clean water into the deep well geothermal system will next be described. The steam exhausted upwardly from the driving turbine at section 5 of that well is conveyed by pipes 9 and 9a to a surface-located heat exchanger element 32 of a conventional heat exchanger 31 and, after condensation therein flows through the normally open valve 36. Heat exchanger 31 may be operated by supplying cooling water in a third loop including a conventional cooling tower (not shown) to pipe 34 connected through heat exchanger element 33 and output pipe 35 back to the same fluid cooling tower. Alternatively, known expedients may be employed for extraction of additional energy during the condensation process for use by power plant 25.

The clean water condensate flowing through normally open valve 36 is pumped by a conventional pressure pump 37 back through the normally open valves 38 and 40 into pipes 8a for injection into the deep well pipe 8 at a pressure substantially above that of the pumped hot well water. Replenishment water may be supplied by opening the valve 41 from a clean water source 42. A conventional filter 39 may be interposed between the normally open valves 38, 40.

Accordingly, it is seen that the invention provides heat exchanger apparatus in a deep geothermal well system at the location of the turbine-driven pump. It thus permits steam exhausted by the pump-driving turbine to cool particularly that part of the re-injected clean water used as a lubricant for hydraulic bearings journalling the shaft of the steam turbine hot well water pump system.

While the invention has been described in its preferred embodiments, it is to be understood that the words which have been used are words of description rather than of limitation and that changes within the purview of the appended claims may be made without departure from the true scope and spirit of the invention in its broader aspects.

I claim:
1. In geothermal deep well pump apparatus of the kind including deep well pump means for pumping a geothermal fluid always in liquid state for flow in cooperative energy-exchanging relation with respect to a second fluid:

injection conduit means for conveying said second fluid in liquid state from a station adjacent the earth's surface at a pressure above the pressure of said geothermal fluid, first discrete heat exchanger means responsive to said geothermal fluid for converting a first portion of said second fluid into its vapor, motive means coupled to said deep well pump means utilizing energy of said vapor for pumping said geothermal fluid, thereby cooling said vapor, second discrete heat exchanger means responsive to said cooled vapor for cooling a second portion of said second fluid, said motive means utilizing said cooled second portion of said second fluid for lubricating bearings thereof while in liquid state, vapor conduit means disposed generally concentrically about said injection conduit means for transfer of said cooled vapor to said station adjacent the earth's surface, geothermal fluid conduit means disposed generally concentrically about said vapor conduit means for transfer of said geothermal fluid to said station adjacent the earth's surface, and vapor expansion diffuser means disposed within said cooled vapor in said vapor conduit means between said motive means and said second discrete heat exchanger means, said motive means, said vapor expansion means, and said second discrete heat exchanger means being disposed in immediate successive axial relation along said vapor conduit means, said vapor expansion diffuser means cooperating in cooling said second fluid, and said vapor expansion diffuser means being supported adjacent said motive means by radial vanes extending from said vapor conduit means inner surface, said vanes additionally providing reduced rotation of said cooled vapor at said vapor expansion diffuser means.

2. Apparatus as described in claim 1 wherein said diffuser means is generally conical in shape, having its base immediately adjacent said motive means and its effective apex immediately adjacent said second discrete heat exchanger means.

3. Apparatus as described in claim 2 additionally including:
condenser means at said station adjacent the earth's surface coupled to said vapor conduit means for re-forming said second fluid, and
second pump means coupled to said injection conduit means for re-injecting said second fluid therein.

4. Apparatus as described in claim 3 additionally including:
electrical power generation means at said station adjacent the earth's surface for converting a major portion of the heat content of said geothermal fluid into electrical power, and
third pump means for pumping the cooled geothermal fluid output of said electrical power generation means back into deep strata of the earth.

* * * * *